US012145082B2

(12) United States Patent
Dasharathi et al.

(10) Patent No.: US 12,145,082 B2
(45) Date of Patent: Nov. 19, 2024

(54) SAMPLE SIZE CHROMATOGRAPHY DEVICE

(71) Applicant: Solventum Intellectual Properties Company, Maplewood, MN (US)

(72) Inventors: Kannan Dasharathi, St. Paul, MN (US); Jon P. Kragness, Farmington, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 544 days.

(21) Appl. No.: 17/420,338

(22) PCT Filed: Jan. 8, 2020

(86) PCT No.: PCT/IB2020/050129
§ 371 (c)(1),
(2) Date: Jul. 1, 2021

(87) PCT Pub. No.: WO2020/148607
PCT Pub. Date: Jul. 23, 2020

(65) Prior Publication Data
US 2022/0062790 A1     Mar. 3, 2022

Related U.S. Application Data

(60) Provisional application No. 62/792,166, filed on Jan. 14, 2019.

(51) Int. Cl.
| B01D 15/22 | (2006.01) |
| B01D 15/36 | (2006.01) |
| G01N 30/06 | (2006.01) |

(52) U.S. Cl.
CPC ........... *B01D 15/22* (2013.01); *B01D 15/363* (2013.01); *G01N 30/06* (2013.01)

(58) Field of Classification Search
CPC ...... B01D 15/22; B01D 15/363; G01N 30/06; G01N 30/6004; G01N 30/90; G01N 30/60; G01N 30/88; G01N 30/96
See application file for complete search history.

(56) References Cited

U.S. PATENT DOCUMENTS

| 4,743,373 A | * | 5/1988 | Rai | .................... G01N 30/6069 |
| | | | | 210/198.3 |
| 4,895,806 A | | 1/1990 | Le | |

(Continued)

FOREIGN PATENT DOCUMENTS

| CN | 106317166 | 1/2017 |
| DE | 202007003784 | 9/2007 |

(Continued)

OTHER PUBLICATIONS

International Search Report for PCT International Application No. PCT/IB2020/050129, mailed on Apr. 24, 2020, 3 pages.

*Primary Examiner* — Waqaas Ali

(57) ABSTRACT

A chromatography device having a housing formed from an upper housing ultrasonically welded to a lower housing. A compression extension and a boss located inside of the housing with the media disposed between the compression extension and the boss such that a perimeter of the media is compressed between the compression extension and the boss forming a liquid impermeable seal along the perimeter after the upper housing is ultrasonically welded to the lower housing.

12 Claims, 8 Drawing Sheets

(56) References Cited

U.S. PATENT DOCUMENTS

| | | |
|---|---|---|
| 6,294,090 B1 | 9/2001 | Nussbaumer et al. |
| 6,610,202 B2 | 8/2003 | Nurok |
| 2004/0035889 A1 | 2/2004 | Mothersbaugh |
| 2017/0252672 A1 | 9/2017 | Ghosh |
| 2018/0120270 A1 | 5/2018 | Saxena |

FOREIGN PATENT DOCUMENTS

| | | |
|---|---|---|
| JP | H04-015555 | 1/1992 |
| WO | WO 2000-050888 | 8/2000 |
| WO | WO 2016/073674 A1 | 5/2016 |

\* cited by examiner

SAMPLE SIZE CHROMATOGRAPHY DEVICE

BACKGROUND

During the development of pharmaceutical molecules, laboratory quantities of fluids must be purified. In biopharmaceutical laboratory screening, small amounts of solution containing recombinant proteins, monoclonal antibodies, or vaccines must be purified for further analysis and testing. Often there is a limited amount of the prototype solution to work with. As such, small-scale devices able to purify small amounts of solution are necessary.

SUMMARY

Membrane chromatography is a relatively new method of ion exchange chromatography which evolved from the bioprocessing industry's need to overcome the limitations of the conventional resin-bead based chromatography. A membrane chromatography device comprises a microporous membrane (media) with pores containing adsorptive sites that can bind the target protein. Since membrane chromatography devices rely on convective mass transfer, higher flow rates can be used without significant pressure drop, resulting in higher throughputs and reduced processing times. There are three major types of membrane based chromatography devices: flat sheet, hollow fiber and radial flow. Flat sheet chromatography devices are typically more popular because they have more absorbent membrane volume.

Membrane chromatography devices come in various sizes often related to the development stage of the molecule. Laboratory devices typically have membrane (media) volumes from about 0.08 to 3 mL. Scale-up or prototype devices typically have membrane (media) volumes from about 15 to 100 mL. Commercial production devices typically have membrane (media) volumes greater than or equal to 200 mL. It should be noted that other membrane volumes can be provided depending on the needs of the customer. In various embodiments of the invention, the membrane (media) volume can be less than or equal to 14, 13, 12, 11, 10, 9, 8, 7, 6, 5, 4, or 3 mL and greater than or equal to 0.01 mL.

One way of calculating membrane (media) volume is to multiply the effective filtration area (EFA) with the nominal membrane (media) height or thickness. Nominal membrane (media) height or thickness can be measured using calipers and the EFA can be measured by filtering a dye solution through the device. The dye binds to the membrane (media) and after the dye breaks through to the outlet stream, the device is cut apart and diameter of dye stain in the layer(s) of the membrane (media) is measured to determine the average diameter or the stained area can be directly measured for example using optical methods. The average diameter of the dye stain (if more than one layer) is used to calculate the EFA using the equation for the area of a circle or the measured areas for each layer can be averaged to find the EFA.

While the invention can be used with any desired membrane (media) volume, it is particularly suited to laboratory devices. While the invention is referred to as "Chromatography device" and "Membrane chromatography device", all aspects of this invention are equally applicable to other kinds of filtration and chromatography media such as (but not limited to) hydrogel functionalized nonwoven, cellulose and diatomaceous earth based charged media, activated carbon, and functionalized membranes. Laboratory chromatography devices with small membrane (media) volumes have three major challenges. These challenges become even more pronounced for devices with membrane (media) volumes less than or equal to 0.5 mL.

Air Entrapment—In small-scale devices, the diameter of the membrane or media is on the same order of magnitude as that of standard Luer connectors used in the bioprocessing industry. This leaves little room to add both an inlet to introduce the fluid into the device and a vent to simultaneously purge the upstream air. Syringe filters and other small-scale chromatography devices in the market today do not have a vent. As such these devices are often accompanied by a complicated multi-step process to purge air. Even with a detailed procedure to purge air in these devices, air entrapment is a significant problem in devices of this size.

Tunneling—During early laboratory testing, the volume of available fluid is typically very low. Laboratory devices should therefore have low head space upstream of the membrane or media to minimize fluid loss. A small headspace coupled with an inlet axially aligned with the membrane or media disc causes the feed solution to "tunnel" through the disc's center leading to premature breakthrough. This tunneling effect is again known in the industry and is due to poor upstream flow redistribution leading to saturation of the solute in the middle of the membrane or media. One possible solution is to increase the head-space which, when combined with membrane or media back pressure, leads to some redistribution and better membrane or media utilization. However, this approach is undesirable as it increases hold-up volume.

Edge Effects—In flat sheet chromatography devices, the membrane or media edge is often sealed by compression. This creates a localized zone near the edge where membrane or media permeability can be reduced. This can lead to a higher pressure drop and less utilization of the chromatography membrane or media. This issue is less of a problem in larger devices where the uncompressed membrane or media area is much larger compared to the area of the compressed edges. However, in laboratory devices, edge compression can have a significant impact. Additionally, when the membrane or media is sealed to a constant height in the device, lot-to-lot membrane or media thickness variations can lead to significant changes in device performance.

Due to the above effects, laboratory devices will often have different performance characteristics compared to scale-up or production devices. Therefore, what is needed is a way of mitigating these effects and controlling for media variations in a laboratory device to match the performance characteristics of scale-up or production devices.

The present invention solves one or more of these problems and resides in a chromatography device comprising: an upper housing having an inlet; a lower housing having an outlet; the upper and lower housings ultrasonically welded together forming a housing by an interlocking weld extension having a chamfered tip located on either the upper housing or the lower housing and an opposing step located on either the lower housing or the upper housing opposite the interlocking weld extension; a housing longitudinal axis through the housing; a compression extension located on either the upper housing or the lower housing positioned closer to the longitudinal axis than the interlocking weld extension and an opposing boss located on either the lower housing or the upper housing opposite the compression extension; and a media disposed between the compression extension and the boss such that a perimeter of the media is compressed between the compression extension and the boss forming a liquid impermeable seal along the perimeter after the upper housing is ultrasonically welded to the lower housing.

In another embodiment the invention resides in a chromatography device comprising: an upper housing having an inlet with an inlet longitudinal axis, a vent with a vent longitudinal axis, and a chamber; the inlet and the vent in fluid communication with the chamber; a lower housing having an outlet; a media disposed in the chamber between the inlet and the outlet; the upper housing and lower housing joined to each other in a fluid tight seal forming a housing with a housing longitudinal axis; and wherein the inlet longitudinal axis is disposed at an angle α to the housing longitudinal axis; the vent longitudinal axis is disposed at an angle β to the housing longitudinal axis; and wherein α and β are between 10 to 80 degrees.

In another embodiment the invention resides in a method of matching the Dynamic Binding Capacity (DBC) of a chromatography device comprising: determining a DBC for a media of a first chromatography device to a challenge solution; providing a second chromatography device having a housing formed from an upper housing ultrasonically welded to a lower housing, a compression extension and a boss located inside of the housing with the media disposed between the compression extension and the boss such that a perimeter of the media is compressed between the compression extension and the boss forming a liquid impermeable seal along the perimeter after the upper housing is ultrasonically welded to the lower housing; forming a plurality of second devices and under varying conditions during ultrasonic welding to change the media compression along the perimeter; testing the plurality of second devices to determine a DBC for each second device to the challenge solution; selecting the ultrasonic welding condition for the DBC of the second device that is approximately the same as the DBC of the first device; and making another plurality of second devices using the selected ultrasonic welding condition.

DETAILED DESCRIPTION

Figure 1:
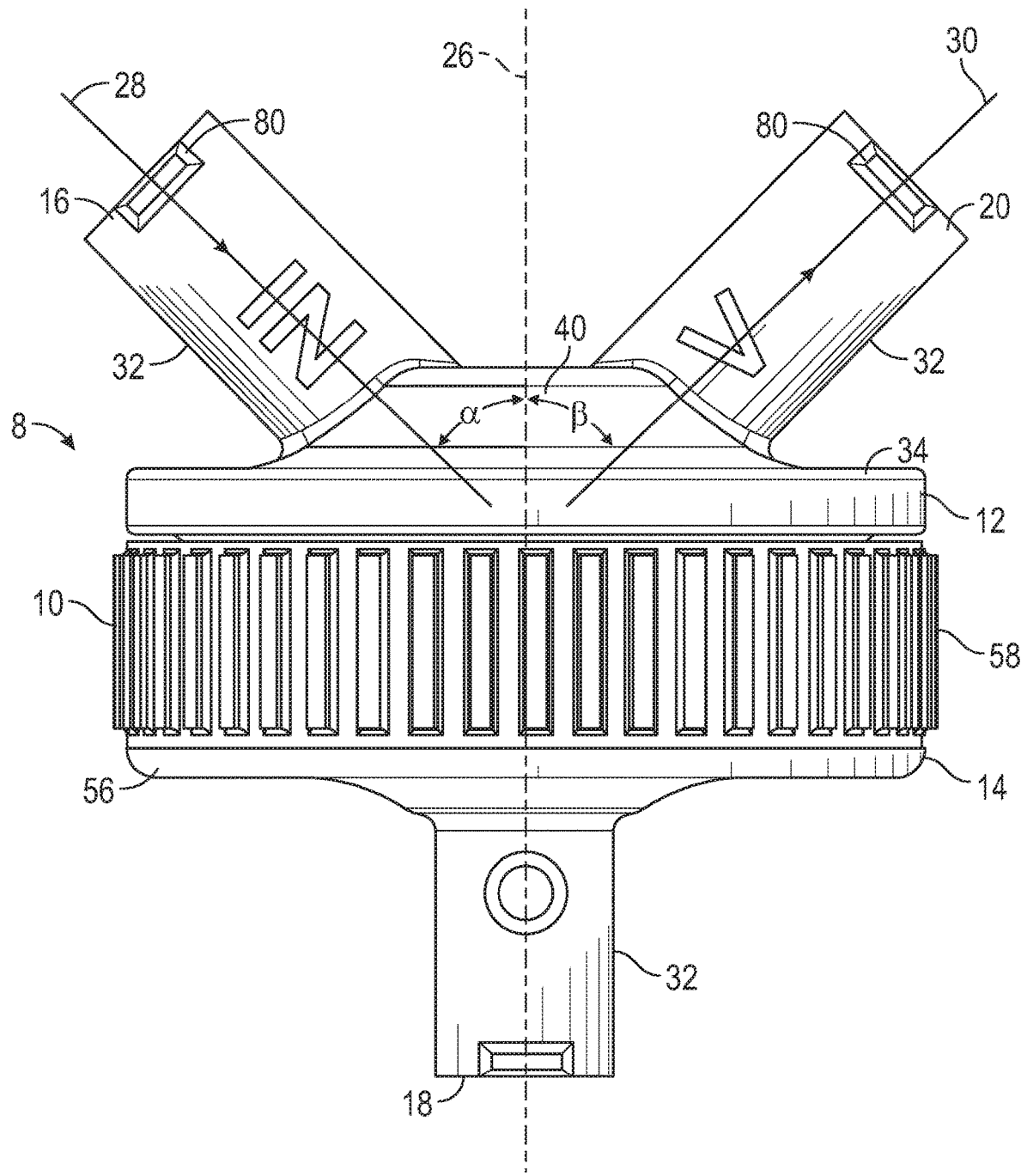
FIG. 1 is a front view of the chromatography device.
Figure 2:
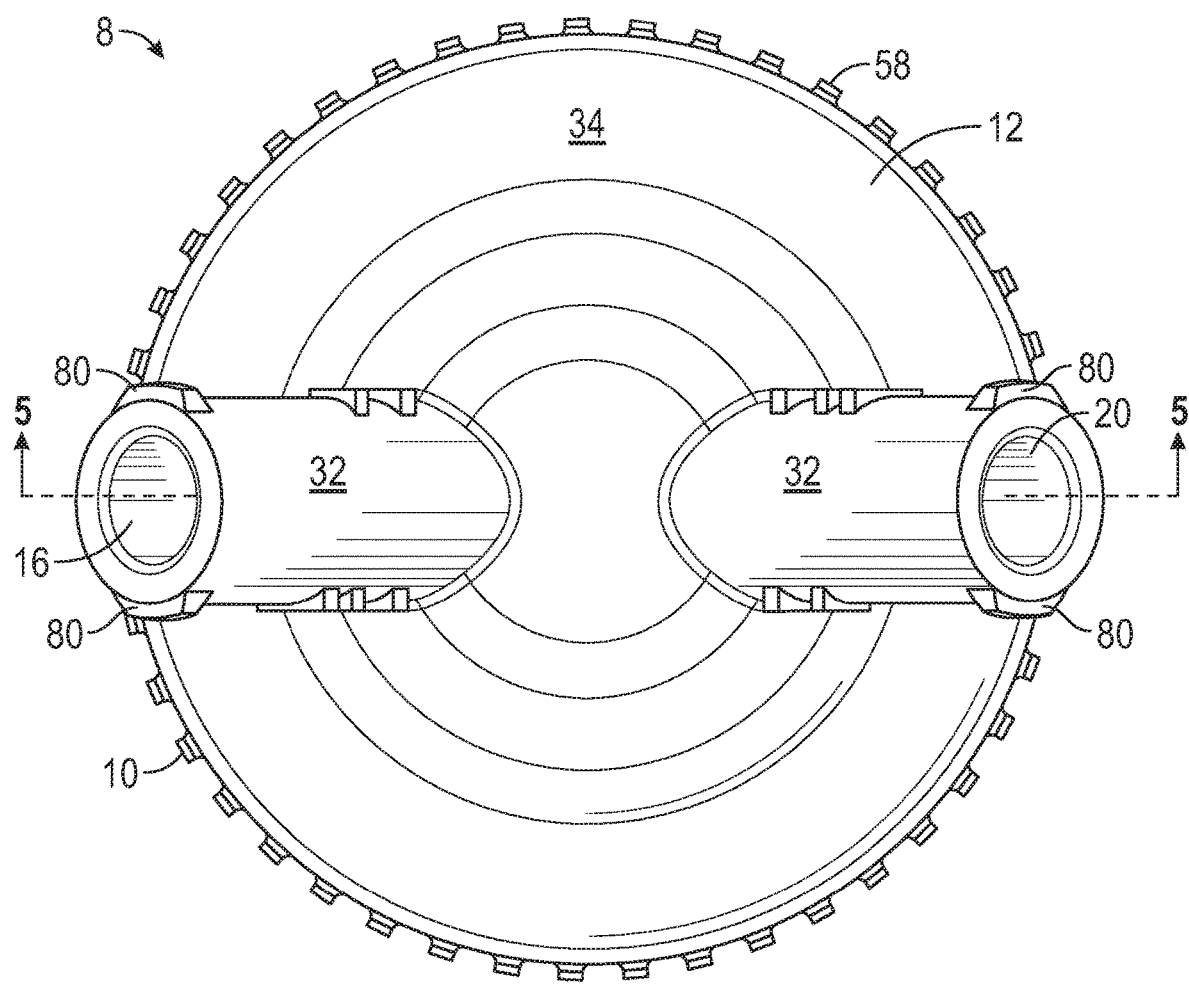
FIG. 2 is a top view of the chromatography device of FIG. 1.
Figure 3:
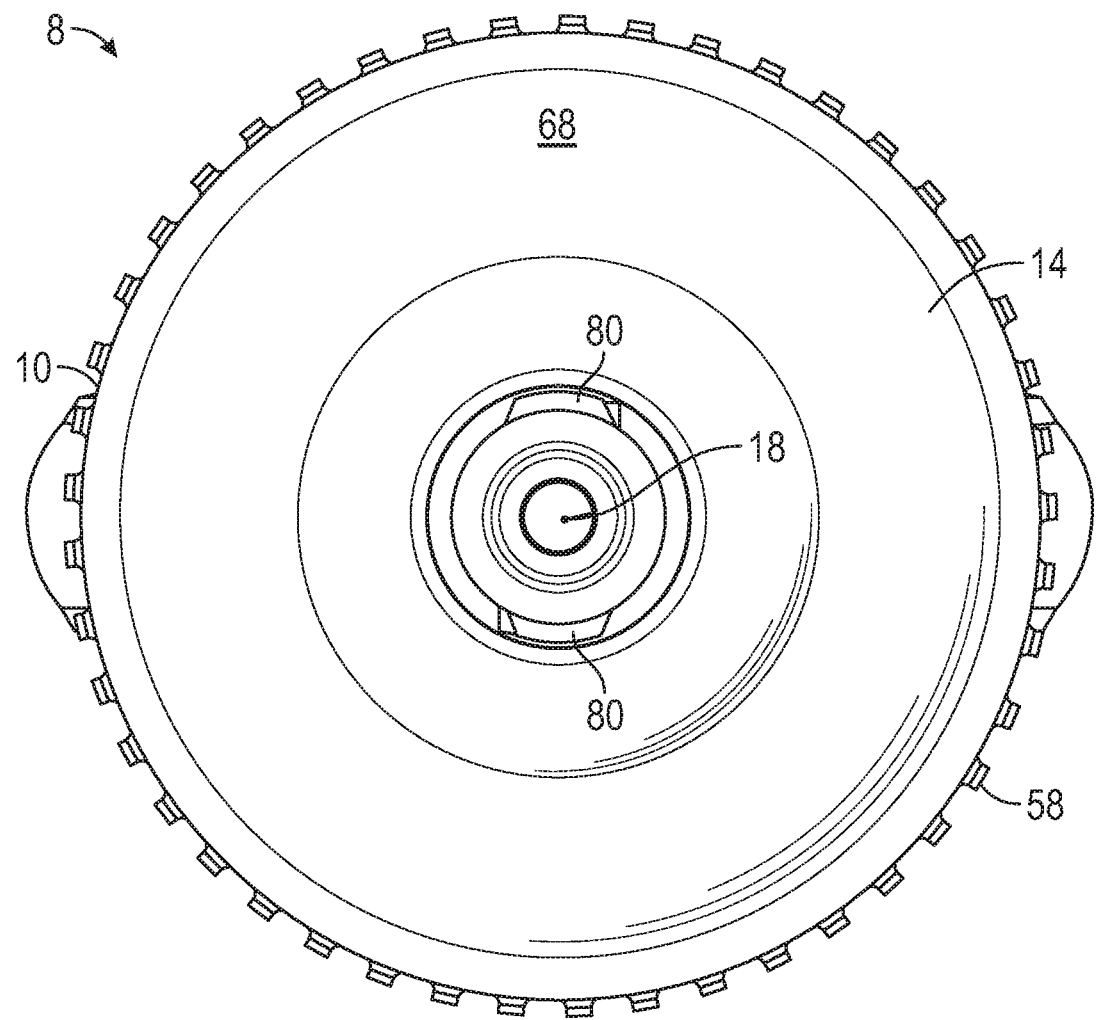
FIG. 3 is a bottom view of the chromatography device of FIG. 1.
Figure 4:
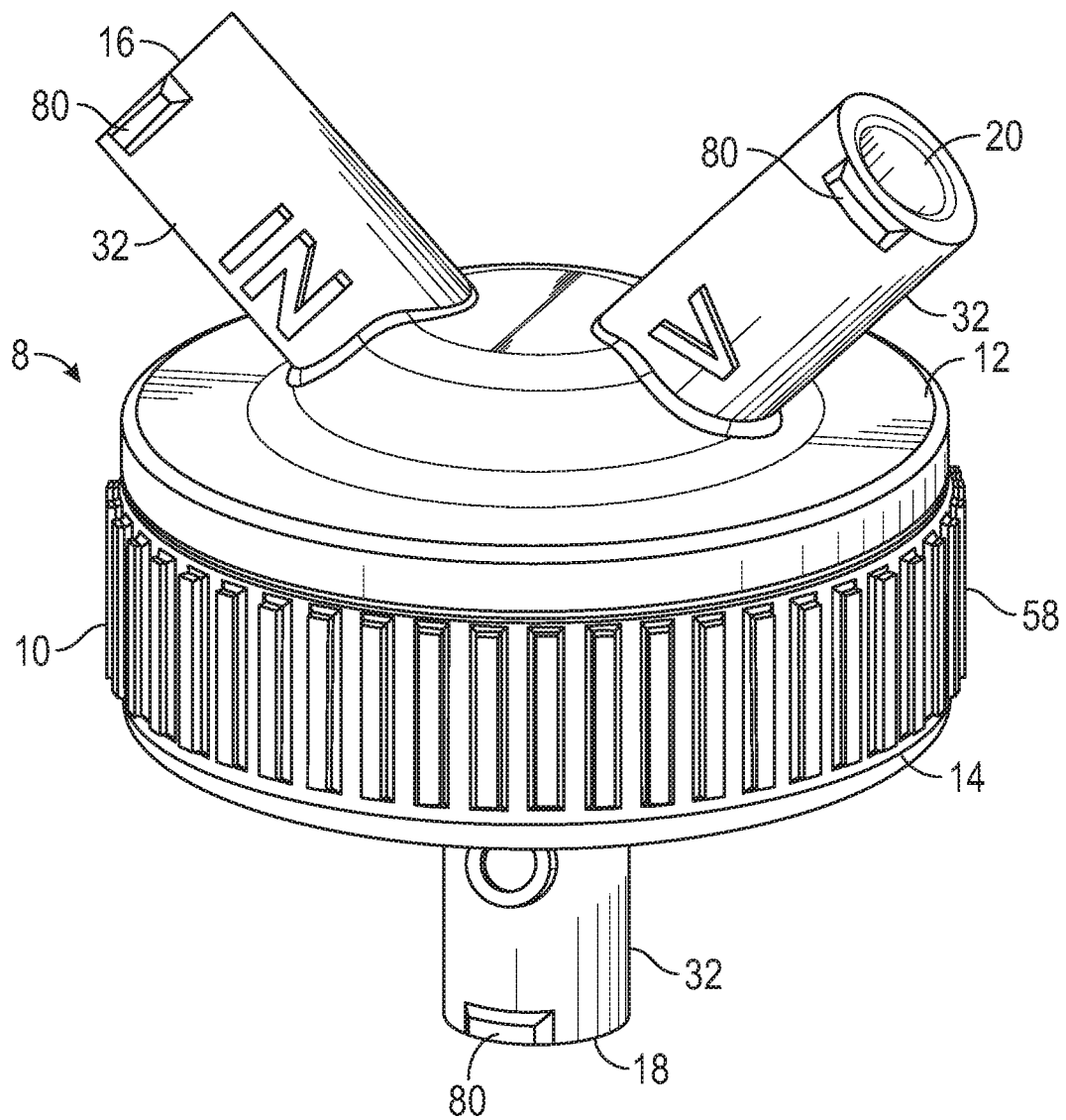
FIG. 4 is a perspective view of the chromatography device of FIG. 1.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than or equal to about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less.

Chromatography Device

Referring now to FIGS. 1, 2, 3, 4, and 5 a chromatography device 8 is shown. The device has a housing 10 formed by joining an upper housing 12 to a lower housing 14. The housing has an inlet 16, an outlet 18, and an optional vent 20. Disposed between the inlet 16 and the outlet 18 is a membrane or media 22 in a chamber 24 such that fluid from the inlet 16 enters the internal chamber 24 and then passes through the media 22 and out the outlet 18. The chamber 24 is in fluid communication with the inlet 16 and the vent 20 such that any air in the chamber 24 can be purged out the vent 20. A Luer lock connector (not shown) can be attached to the vent 20 and used as a valve to purge the air from the chamber 24 until liquid from the inlet 16 begins to exit from the vent 20 and the valve is closed. In the illustrated embodiment, the membrane volume is 0.08 mL but this can be readily changed by increasing or decreasing the diameter of the media and adjusting the size of the housing to that diameter.

As seen in FIG. 1, at least one of the inlet 16 and the vent 20 is disposed at an angle to the longitudinal axis 26 of the housing 10 and preferably both are disposed at an angle to the longitudinal axis. As seen, the inlet 16 is disposed at an angle α to the housing longitudinal axis 26 and the vent is disposed at an angle β to the housing longitudinal axis. This provides two benefits. First it provides sufficient clearance for the use of Luer lock connectors on both the inlet 16 and the vent 20 to be used providing for a fast and convenient method to purge air from the chamber 24. An axially aligned inlet does not provide sufficient clearance in small-volume laboratory devices to include a vent with a positive lock seal such as a Luer lock connector.

Figure 5:
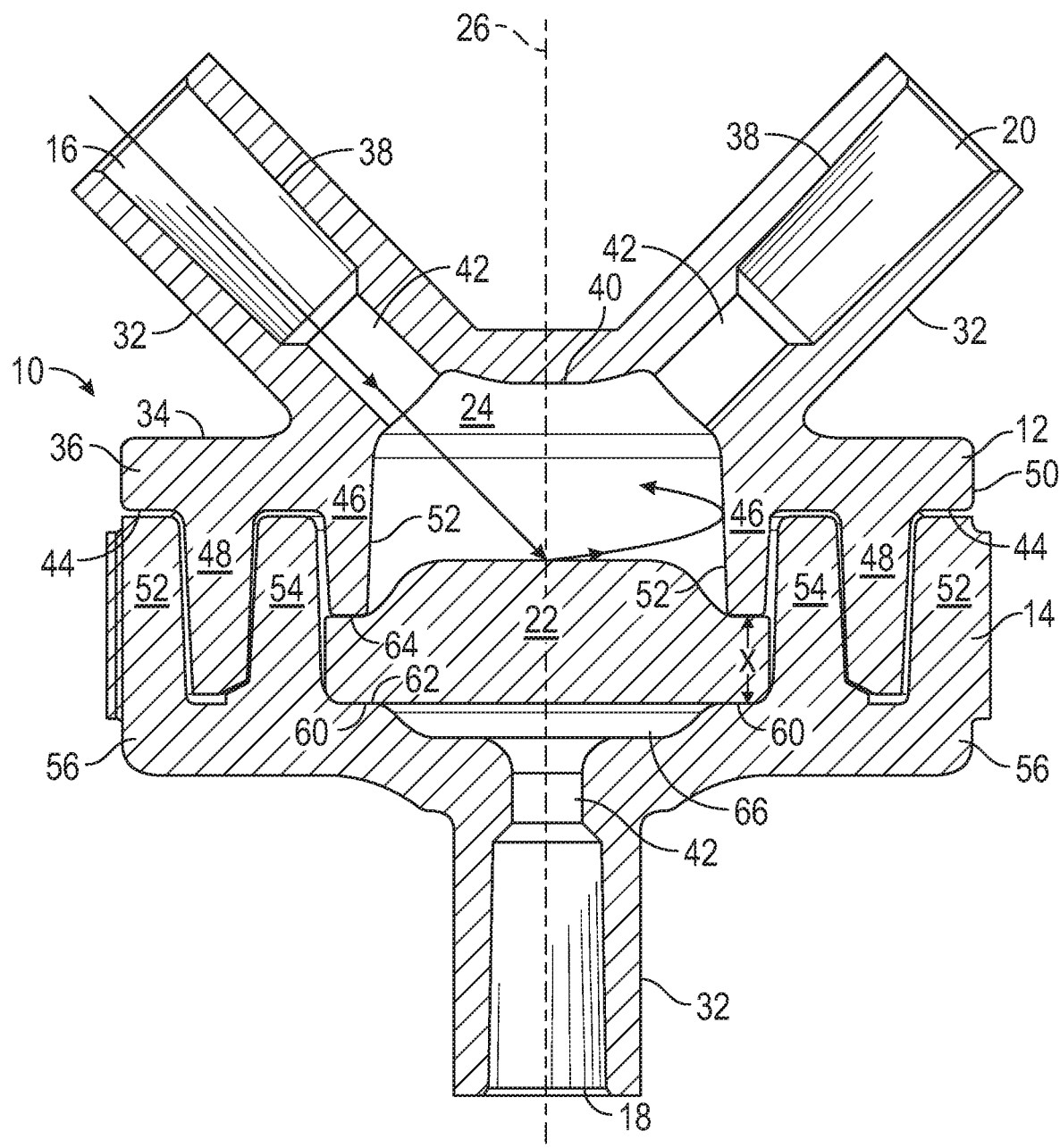
FIG. 5 is a cross section view of the chromatography device taken at 5-5 in FIG. 2.

Secondly, an angled inlet 16 directs the incoming fluid flow as it is passing through the chamber 24 to hit the media's upper surface at an angle other than 90 degrees as shown by the arrow in FIG. 5. With the inlet axially aligned parallel to the longitudinal axis 26, the incoming fluid strikes the media's surface at approximately 90 degrees directly in the center of the media. This design suffers from the tunneling problem discussed above. Angling the inlet 16 such that the incoming fluid flow has a tangential direction velocity component parallel to the media's upper surface will cause at least some of the incoming fluid to flow across at least a portion of the media's upper surface prior to flowing through the media. This is not unlike the action of throwing a pail of water onto a floor at angle to flush the floor and spread the water along the floor in a direction away from the person emptying the pail. Angling the inlet not only helps to prevent tunneling, but also helps drive air from the chamber 24 towards and out of the vent 20. The angular position of the inlet can be designed such that a volume of buffer or solute flowing into the device does not immediately permeate the media due to surface tension and edge effects, and instead flows on top of the media and into the chamber wall. This motion of an incoming fluid volume results in an automatic redistribution and mixing within the chamber thereby providing a more uniform utilization of the media's capacity.

In various embodiments of the device, the angle α between the longitudinal axis 28 of the inlet and the housing longitudinal axis 26 can be from about 10 to about 80 degrees, from about 25 to about 65 degrees, or from about 40 to about 50 degrees. In various embodiments of the device, the angle β between the longitudinal axis 30 of the vent and the housing longitudinal axis 26 can be can be from about 10 to about 80 degrees, from about 25 to about 65 degrees, or from about 40 to about 50 degrees. The angle α can be the same as, less than or greater than the angle β. Additionally, if only one of the inlet and the vent is angled for Luer lock clearance, preferably the inlet is angled for the positive flow effects described above. In the illustrated embodiment, the angle α was 45 degrees and the angle β was 45 degrees such that the inlet and the vent can be interchanged if needed and used for the opposite function.

The upper housing 12 and lower housing 14 are designed to be ultrasonically welded together to form the final liquid tight housing while also providing an edge seal for the media. In particular, the force applied to the housing acting to compress the upper and lower housing portions during assembly is controlled while ultrasonic welding to reliably control the compression of the media regardless of changes in media thickness. More about the unique welding process will be discussed latter. The housing 10 is generally circular, but any other suitable shape may be employed.

As best seen in FIG. 5, the upper housing 12 includes two cylindrical projections 32 extending from an upper surface 34 of an upper disc 36 on each side of the housing longitudinal axis 26 and disposed at an angle to the housing longitudinal axis forming a truncated V-shape between them. Each cylindrical projection has a tapered internal bore 38 to fit the Luer lock taper and is in fluid communication with the chamber 24. A truncated hemispherical surface 40 is present inside the chamber 24 and is molded into the center of the upper disc 36 between the inlet and the outlet to reduce the chamber's volume. The tapered bores 38 of the inlet and vent are in fluid communication with a cylindrical passage 42 that leads to the chamber 24 thus providing for the passage of fluid though the tapered bore into the cylindrical passage and into the chamber of the assembled housing. The chamber is generally cylindrical in shape with a truncated hemispherical upper surface as shown. Other chamber shapes may be employed and, in general, the overall size of the chamber is as small as possible to reduce hold-up volume while still allowing for fluid communication between the inlet, the vent, the chamber, and the surface of the media.

As used herein upper housing 12 is a relative term for convenience and in one embodiment is the housing portion having both the inlet 16 and the vent 20 into the chamber 24. In a like manner, lower housing is a relative term for convenience. First housing portion can be used instead for the upper housing and second housing portion can be used instead for the lower housing. Throughout the specification for any element referenced where the term "upper" appears "first" can be substituted and where the term "lower" appears "second" can be substituted.

Figure 6:
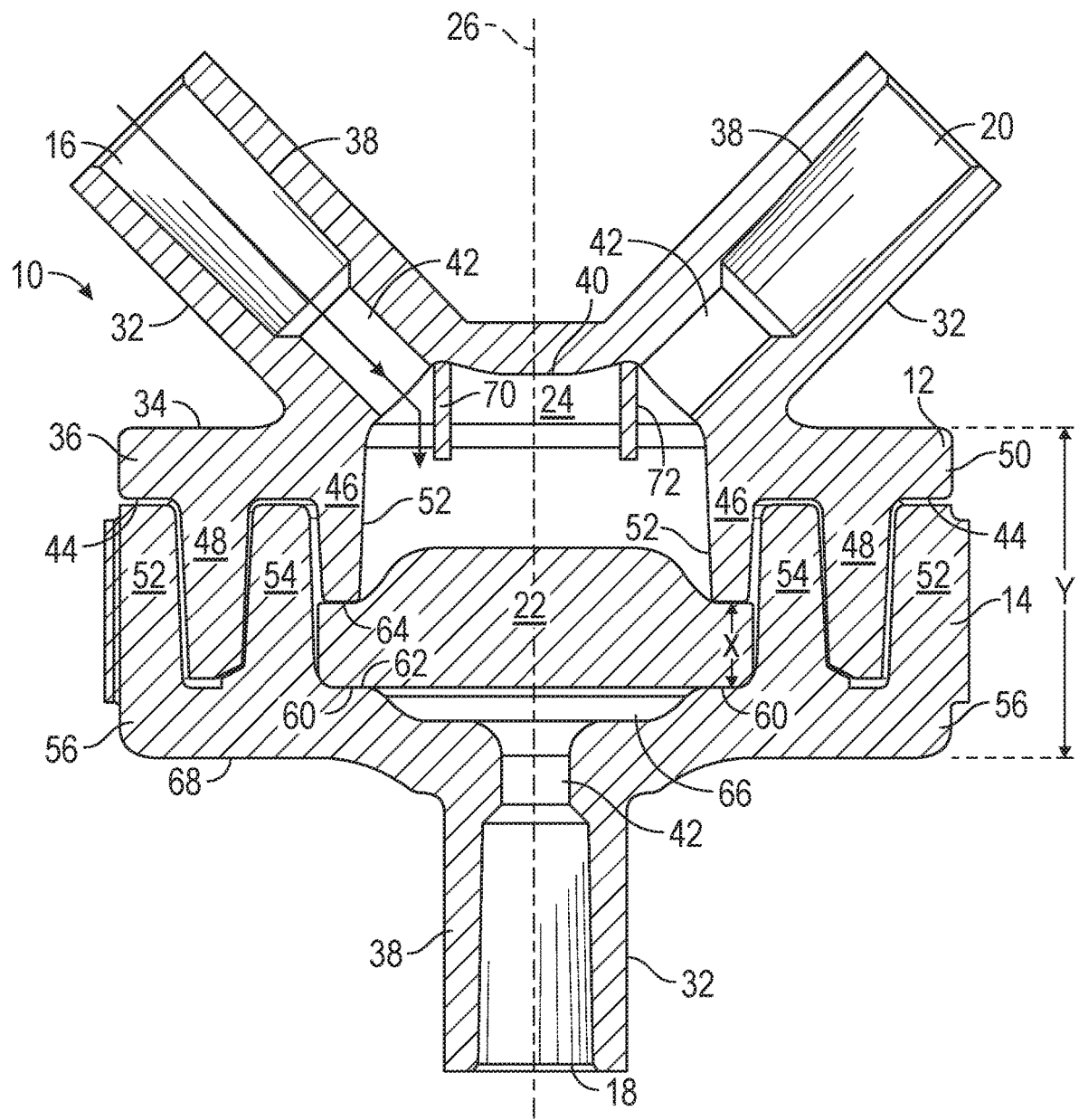
FIG. 6 is a cross section view of the chromatography device as pictured in FIG. 5 illustrating another embodiment.
Figure 7:
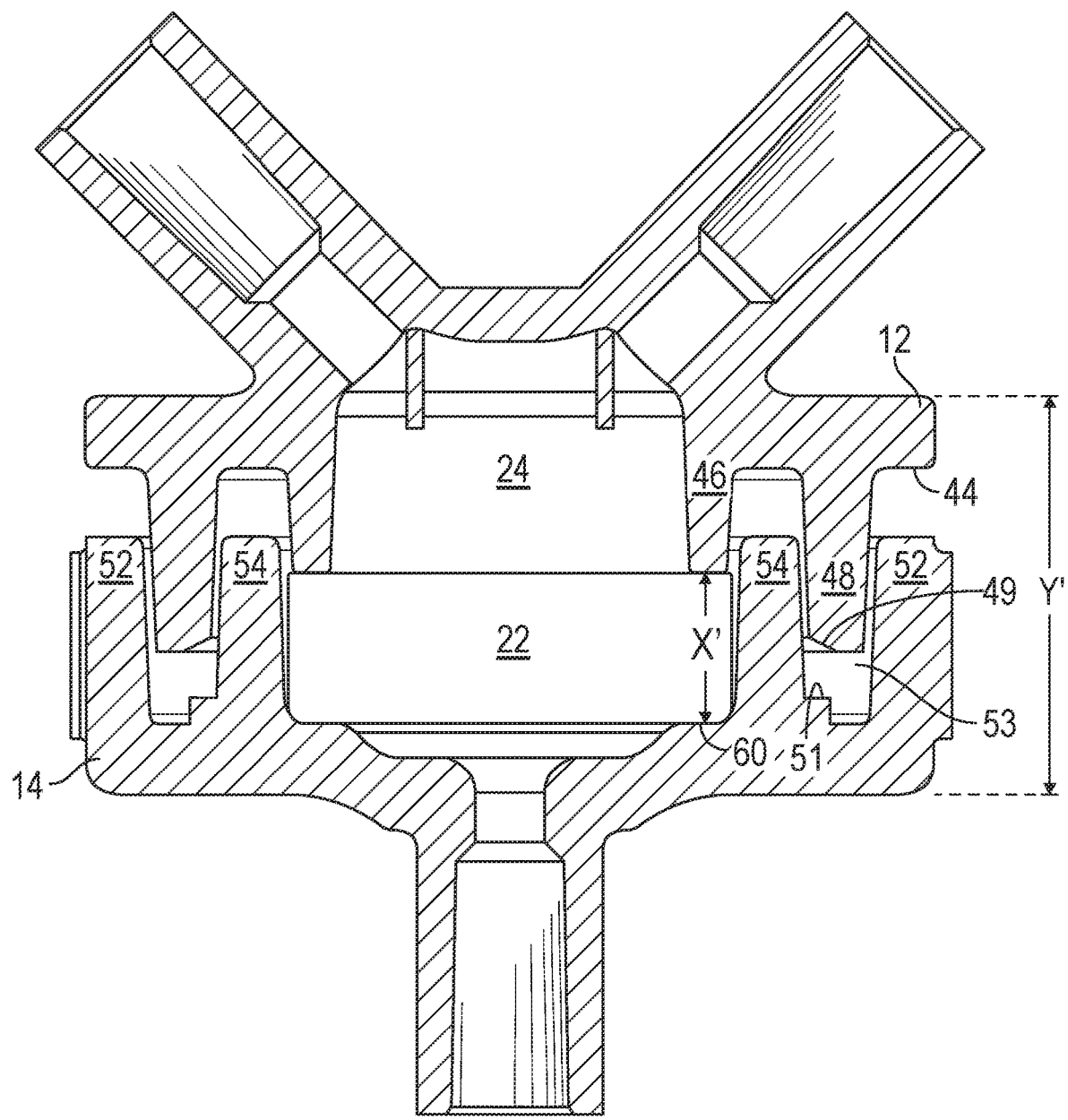
FIG. 7 is a cross section view of the chromatography device as pictured in FIG. 6 prior to ultrasonic welding of the upper and lower housing.
Figure 8:
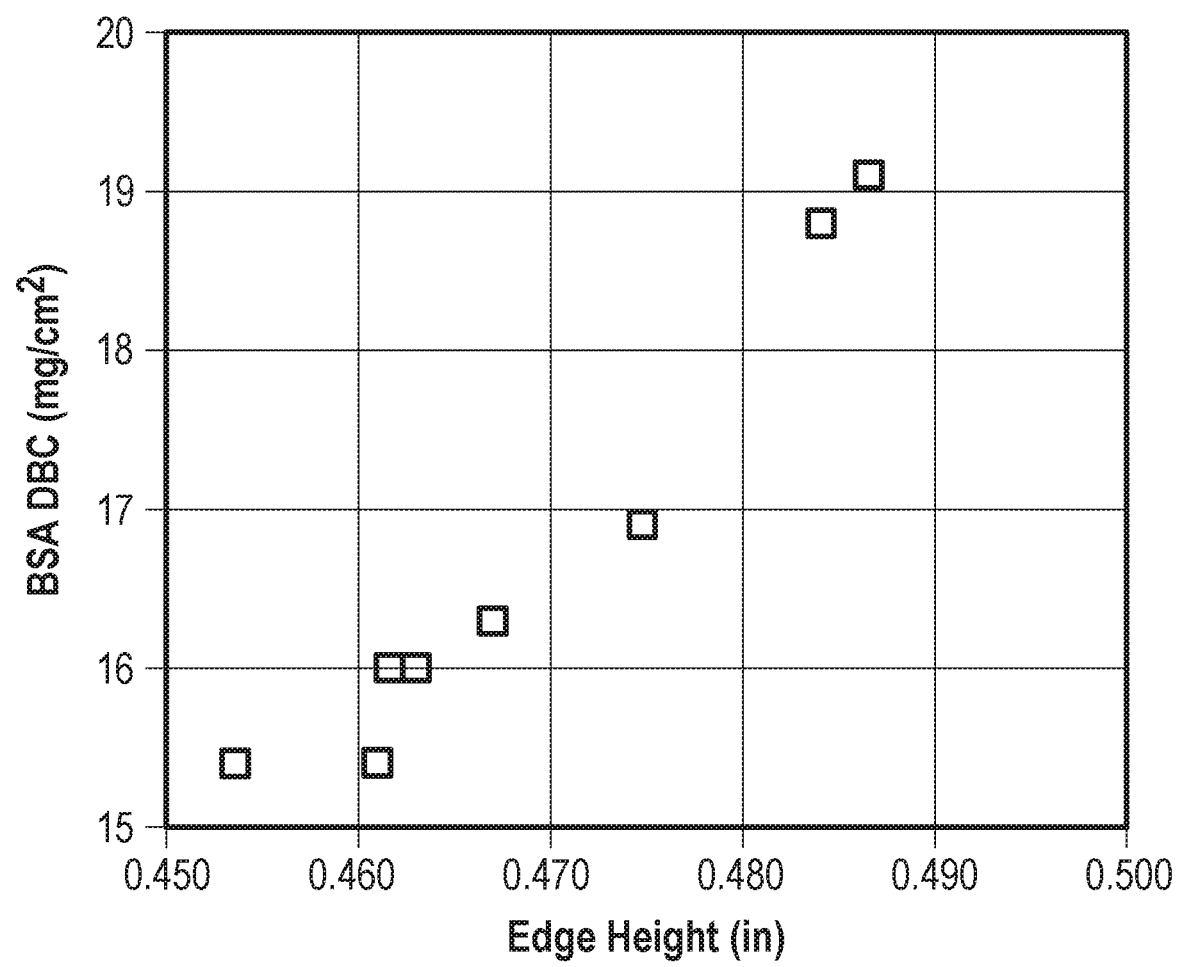
FIG. 8 is a graph of binding capacity vs housing height Y of one embodiment of the chromatography device.

As seen in FIGS. 5, 6, and 7 extending from the lower surface 44 of the upper disc 36 of the upper housing 12 is a compression extension 46, which in some embodiments is a protruding ring structure. For other geometric shapes for the perimeter of the media besides circular, such as square or hexagonal, the compression extension would assume the same corresponding shape of the perimeter of the media. The compression extension 46 in cooperation with the boss 60 supporting the media 22 compresses the perimeter of the media to a distance X as drawn. This seals the perimeter of the media from leaking and bypassing fluid from the chamber 24 to the outlet 18 around the perimeter of the media. Sufficient compression is necessary to prevent leaking; however, if the media is over compressed, too much media area is lost due to the compression and the performance of the laboratory device can deviate significantly from a scale-up or production device using the same media. Thus, the height of the compression extension protruding from the lower surface 44 in conjunction with how tightly the upper and lower housings are squeezed together while being ultrasonically welded controls the distance X and the resulting edge compression of the media disc 22. During actual ultrasonic welding, the welding energy is set to control the relative edge compression of the media. While the housing is drawn with the compression extension 46 extending from the lower surface of the upper housing in combination with a boss 60 on the lower housing the two components can be switched and the compression extension 46 can extend from the lower housing and the boss 60 can reside on the upper housing. The boss 60 can be raised up from the surrounding surfaces inside of the housing as well in an alternative embodiment. For example, two extensions can be used to squeeze the perimeter of the media to seal it.

Protruding from the lower surface 44 of the upper housing 12 is an interlocking weld extension 48 that becomes welded to the lower housing 14. In some embodiments, the interlocking weld extension is also a protruding ring with a chamfered tip 49 for use during the ultrasonic welding process. The interlocking weld extension is located outboard of the compression extension at a greater distance from the housing longitudinal axis. The interlocking weld extension 48 initially abuts a step 51 in an optional recess 53 in the lower housing as seen in FIG. 7. The central part of the housing has a height Y' before welding and the compression extension has a height of X'. Because of the chamfer and step, the final height of the housing Y can be altered with increasing amounts of ultrasonic energy applied to the housing during welding. This then affects the final compressed edge dimension X. As more energy is applied during the ultrasonic welding process, more of the step height 51 is reduced and the chamfered tip 49 slides deeper into the recess 53. Compare FIG. 7 to FIG. 6. Thus, even though the parts are fully welded to each other, the final height of the capsule Y can be varied which in turn varies the edge compression distance X. As will be seen later, the dynamic binding capacity of the device is proportional to the distance X as controlled by the height Y of the housing during ultrasonic welding as the two housing portions are forced together by the horn and anvil of the ultrasonic welder. Applying more energy decreases the final assembly height Y by allowing the chamfered tip 53 and the interlocking weld extension 49 to slide deeper into the recess 53 resulting in more edge compression of the media and a reduced height X. The opposite holds true for less applied welding energy resulting is a larger final assembly height Y and less edge compression and a larger dimension X. While the housing is drawn with the interlocking weld extension 48 extending from the lower surface 44 of the upper housing 12 and the step 51 on the lower housing 14, the interlocking weld extension 48 can extend from the lower housing 14 and the step 51 can reside on the upper housing. The cross-sectional profile of the interlocking weld extension and the shape of its perimeter can be adjusted for different housing geometries. A ring shape is suitable for a circular media 22 as shown.

In one embodiment, a circular media was used and the compression extension and interlocking weld extension were protruding rings as described next. Extending from the lower surface 44 of the upper disc 36 is a first protruding ring 46 for the compression extension to compress the media's perimeter and a second protruding ring 48 for the interlocking weld extension that is disposed inward of an outer diameter 50 of the upper disc 36. The longitudinal length of the first protruding ring is selected to pinch and seal the media perimeter. The longitudinal length of the second protruding ring is selected to ultrasonically weld and mate with features on the lower housing while allowing for the dimension X to be varied within a range of heights while still maintaining a media seal along the perimeter. Media with significant thickness changes may need to have different longitudinal length dimensions for the protruding rings so as to not over compress the media reducing performance or failing to seal it along the edges to prevent bypass. As seen, the first and second protruding rings have sidewalls that taper with thicker bases and narrower tips. Other cross-sectional geometries can be utilized. The first sidewall 52 of the first protruding ring 46 forms a portion of the sidewall of the chamber 24 below the inlet and the vent.

As best seen in FIG. 5, the lower housing 14 has a third protruding ring 52 and a fourth protruding ring 54 extending from an upper surface of a lower disc 56. These protruding rings are optional, but preferred. A valley or recess 53 is formed between the two rings into which the interlocking weld extension is disposed for ultrasonic weld attachment to the lower housing. The external sidewall of the fourth protruding ring 52 forms the majority of the external sidewall of the assembled housing and can optionally be knurled or have longitudinal ribs 58 spaced along the perimeter to provide enhanced grip while handling the housing 10. The internal sidewalls of the third and fourth protruding rings are sloped to match the taper of the second protruding ring on the upper housing for nesting of the two housing portions. Nesting the interlocking weld extension 48 between the third and fourth protruding rings (52, 54) provides more structural integrity to the welded housing allowing for the assembled housing to better resist lateral forces to the housing without breaking the ultrasonic weld. Additionally, the inner surface of the third protruding ring 52 acts as a guide and a centering device for locating the circular media 22 onto the boss 60 when assembling the components as best seen in FIG. 7.

Inboard of the fourth protruding ring at the base of its innermost sidewall is the circular boss 60 that supports the perimeter of a circular media disc 22 placed into the center of the lower housing. The fourth protruding ring can generally guide the media into position and center the media onto the supporting boss 60. The distance, X, from an upper surface 62 of the boss to the tip 64 of the first protruding ring 46 (compression extension) is selected to affect the necessary compression of the media to provide a fluid tight seal along the perimeter of the media disc and to best match the performance of the laboratory device to a scale-up or production device by controlling this distance during the ultrasonic welding process. Below the circular boss is an optional circular dished shaped recess 66 acting as a funnel to direct filtered fluid to the outlet. A cylindrical projection 32 parallel to and concentric with the housing longitudinal axis 26 extends from the lower surface 68 of the lower disc 56. The cylindrical projection has a tapered internal bore 38 to fit the Luer lock taper and is in fluid communication with the dished recess 66. The tapered internal bore 38 of the outlet is in fluid communication with a cylindrical passage 42 that leads to the dished recess thus providing for the passage of fluid from the dished recess through the cylindrical passage and though the tapered bore and out of the housing.

A unique feature of the housing's design is the combination of the media pinch with the discussed perimeter seal of the media within the device. Typically, chromatography devices have O-rings or washers to seal and compress the media. One of the features of this design is the incorporation of the media pinch between the upper housing and lower housing via the first protruding ring's tip and the circular boss as shown in FIG. 5. This provides a straight forward way to control the media compression and can accommodate thickness variations in the chromatography media since the housing portions are ultrasonically welded under a fixed load and the final welded height can vary as the thickness of the media varies. This design for the device assembly combined with the ultrasonic welding of the upper and lower housing portions ensure that edge effects remain consistent despite media thickness variations and provides a way for predictable device capacity and pressure drop as seen in the Examples.

Typical laboratory-scale chromatography devices in the market today are made by assembling a two-piece housing (inlet housing portion, outlet housing portion) with the internal media disposed between the housing portions, compressing the overall assembled housing to a fixed height and then using an overmolding process. The overmolding process involves compressing the two housing portions to the final specified height and then shooting molten plastic onto the outside of the housing assembly to form a fluid tight housing that maintains the pre-determined compressed assembly height prior to application of the molten plastic. During this process, several tons of force can be exerted on the chromatography media, which leads to a prominent and large compressed perimeter zone. This large compressed perimeter zone reduces the performance of the chromatography device as discussed above. The large compression force on the assembled housing portions is necessary during the overmolding process to contain the molten plastic and prevent flash. The pre-determined mold height is selected to prevent flash. Because of this, thicker media experiences a larger compression than thinner media causing significant performance variations in small volume chromatography devices. This approach to making chromatography devices is less versatile in the sense that multiple molds for the overmolding process would be needed to ensure compression of the chromatography media at the perimeter was the same for various media thicknesses.

Ultrasonic bonding on the other hand, can involve compressing the assembly of inlet housing portion, outlet housing portion and internal chromatography media to a specified force rather than to a fixed height. Upon reaching this pre-determined force, the ultrasonic weld process is initiated and the vibrational energy applied to the energy director causes localized melting and bonding. In this process, only several pounds of force (orders of magnitude smaller than what is observed during the overmolding process) are experienced by the edges of the chromatography media. Ultrasonic bonding leads to a smaller compressed perimeter zone and the actual amount of compression can be controlled by the applied energy during the ultrasonic welding process, which varies the final height of the assembled housing. Furthermore, because initiation of the welding is triggered by a force setpoint, normal variations in the media thickness does not appreciably impact the size of the perimeter affected compression zone. Thicker media will have a taller housing height and thinner media will have a shorter housing height. The welding process is self-compensating for variations in media thickness. Thus, the present design provides a simple way to ensure consistent device performance.

This approach to making chromatography devices is extremely versatile and can accommodate chromatography media of different thickness. Large deviations in media thickness for different types of products may require different longitudinal lengths for the compression extension and the interlocking weld extension, but nominal variations due to manufacturing tolerances are readily handled and the chromatography devices produced by the method will have more consistent performance.

Referring now to FIG. 6, another embodiment of the chromatography device is shown. Extending from the ceiling of the chamber is a baffle 70 that redirects the inlet flow to a direction more parallel with the housing longitudinal axis as shown by the arrow. In one embodiment, the baffle was a fifth protruding ring having a sidewall 72 generally parallel to the longitudinal axis 26 and extending a sufficient distance in the longitudinal direction to redirect the inlet flow as described but short enough to prevent interference between swollen media and the baffle feature. The outer diameter of the fifth protruding ring is small enough to fit between the cylindrical passages 42 of the inlet and vent with the fifth protruding ring nominally starting just inboard of where these passages meet with the chamber 24 as shown. In some embodiments, the height of the fifth protruding ring in the longitudinal direction is the same order of magnitude as the diameter of the Luer connectors such as between about 3 to about 6 mm.

The baffle 70 may be required depending on the surface tension and wetting characteristics of the chromatography membrane. The baffle helps to direct the inlet flow of the buffer or solute along the chamber sidewall and onto the compressed perimeter of the media. Since the permeability of the media can be lower in this area, the buffer or solute tends to redistribute towards the center of the media disc to pass through the media. This phenomenon is another way to combat tunneling as previously described.

Suitable chromatography membranes or media for use with the device are known and can include chromatography membranes or media available from 3M Corporation, Pall Corporation, or Sartorius. In general, the media is die cut to a suitable diameter having the correct membrane volume for the desired application and the diameter of the circular boss is selected to be same or slightly larger than the diameter of the media.

The cylindrical projections forming the inlet, the outlet, and the vent can be sized to mate with tapered Luer lock connectors. To facilitate the Luer lock connector, the outer surfaces of these cylindrical projections 32 can have two opposing transverse tabs 80 extending from the outer circular diameter of the cylindrical projections and disposed near the distal ends of the cylindrical projections. The tabs engage with the threads in the male Luer lock connector. Optionally, other fluid connectors such as hose barbs can also be used to route fluids into and out of the chromatography device.

The chromatography device is preferably injection molded from a suitable material. Desirably this material is readily ultrasonically welded such that the upper housing and lower housing can be joined in a fluid tight manner. Suitable materials for the housing include thermoplastics such as Acetal (POM), Acrylic (PMMA), Acrylonitrile Butadiene Styrene (ABS), Polycarbonate (PC), Polyethylene (LD/HDPE), Polyphenylene Oxide (PPO), Polyphenylene Sulphide (PPS), Polypropylene (PP) etc.

Alternatively, other means of fastening the upper housing to the lower housing can be used such as a liquid tight, threaded connection as used for example on common water pipe. The upper and lower housings could be made of suitable materials for the threaded connection such as plastic or metal.

Alternatively, the housings can be 3D printed using a three-dimensional printer. In this case, the housings can be bonded together using adhesives such as epoxy or acrylic to form liquid tight seal.

Method of Matching Laboratory Chromatography Device Performance to Performance of Another Chromatography Device.

The initial work in pharmaceutical development is done at the laboratory scale. Suitable candidates then progress to scale-up and then into production for commercial sale. Different chromatography devices having different capacities and media volumes are used along the process. It is important that consistent results are achieved regardless of the device size selected, so that as trials progress similar results are achieved when moving to the next larger device.

All chromatography devices have a binding capacity reflecting the point where the active chemistry on the media has been fully utilized. At that point, the devices stop working for the intended purpose and target molecules are no longer removed from the solution passing through the media. One way of matching device performance is to ensure that the relative binding capacity for a laboratory device is the same as it is for a scale-up or production device. Thus, if devices having substantially different membrane volumes have the same binding capacity in $mg/cm^2$ for a suitable challenge solution they will have similar performance.

Dynamic Binding Capacity (DBC) can be measured using a known challenge solution at a specified initial concentration of the target molecule to be removed and then pass this solution through devices having the same media but significantly different membrane volumes or sizes. Monitoring the effluent of the device until a specified final concentration of the target molecule is observed provides a breakthrough curve; with this, the amount of challenge solution passed through the media can be used to calculate the mass in mg of target molecule removed per $cm^2$ of media area. If both a laboratory device and a larger device have the same value for DBC, their performance in filtering the challenge solution will be similar if not identical.

However, until the current invention, there was not an easy way to change the binding capacity of a laboratory chromatography device. An unexpected correlation was found indicating that for small-scale devices, the DBC is approximately linearly related to the perimeter compression of the media (FIG. 7). Thus, one way of matching laboratory device performance to that of a scale-up or production device is to adjust the media compression as controlled by distance X to achieve the same DBC as the larger device.

One way of carrying this out is to measure the DBC of another chromatography device having a significantly larger membrane volume to a challenge solution. For some 3M scale-up and production devices with a particular media construction, the DBC at a 10% breakthrough for a Bovine Serum Albumin (BSA) solution at an initial concentration of approximately 1 mg/ml is in the range of 18-20 $mg/cm^2$. Next, the same DBC at a 10% breakthrough of the laboratory device using the same media construction is mapped for different levels of perimeter compression X as shown in FIG. 7. Since this is an internal dimension that is hard to directly measure, the overall height Y of the center of the housing is measured from which the distance X can be determined. During the ultrasonic welding process, the welding energy in Joules is varied which changes the overall height of the housing Y and hence the dimension X affecting perimeter compression of the media. For a range of energy levels, such as 200-700 Joules, various laboratory devices are made. Each laboratory device is then tested to determine the DBC at a 10% breakthrough to the BSA solution of approximately 1 mg/ml and plotted versus the housing edge height Y as shown in FIG. 7 and listed in Table 1. As seen, for a housing edge height of approximately 0.490 inch, the DBC of the laboratory device is in the range of 18-20 $mg/cm^2$ which matches the performance of the previously measured production chromatography device. This occurs at a welding energy of approximately 200 Joules. Thus, production of laboratory devices is then carried out at the ultrasonic welding conditions that matched the dynamic binding capacity performance of the production device. As such, matched performance of the laboratory device to the production device is achieved, providing a significant customer benefit during the pharmaceutical development process.

As used herein "Dynamic Binding Capacity (DBC)" means the mass of a target molecule captured from a challenge solution by the membrane (media) at a specified flow rate as a function of membrane (media) area with an endpoint defined as a specified concentration of the target molecule being detected in the device effluent. In one embodiment, the DBC was measured by using an accurately known concentration of ~1.0 mg/ml solution of BSA in 20 mM sodium phosphate (aq). The solution is passed through the through the test device at the standard flow condition of 210 LMH (liters per $meter^2$ membrane surface area per hour). Endpoint is determined by breakthrough of the BSA challenge solution as indicated by a 10% absorbance value of the effluent (based on initial BSA solution defined as 100%) using UV detection at 280 nm. The dynamic binding capacity is then determined using the volume of challenge solution passed through the test device prior to reaching the endpoint condition, and calculating the mass of BSA in that volume. Dynamic binding capacity is this mass divided by the effective membrane (media) area.

As used herein a "challenge solution" means a solution with an accurately known concentration of a target molecule that may be selectively bound to the device's membrane (media). In one embodiment, the challenge solution has a target value of 1 mg/mL BSA. An aqueous 20 mM phosphate solution is prepared from 2.75±0.005 g sodium phosphate monohydrate dissolved in 1 liter of water. Approximately 300 mg of BSA is sprinkled on the surface of 250 mL of the phosphate solution. The BSA is allowed to dissolve in the buffer by slow hydration for at least 1 hour. The solution is then passed through 0.2 μm filter into a sterile media bottle. Absolute concentration of the BSA is determined using Beers Law by measuring the UV absorbance of the solution at 280 nm with 0.667 as the extinction coefficient $(\varepsilon)b$.

EXAMPLE

A chromatography device with a media or membrane volume of approximately 1 mL was evaluated. The upper and lower housings are injection molded using a polypropylene random copolymer with a mass melt flow rate (MFR) of 9.0 g/10 min. The selected chromatography media had three primary components: an anion exchange nonwoven, an anion exchange membrane, and a membrane support. The anion exchange nonwoven media was composed of four layers of polypropylene nonwoven with a covalently attached quaternary ammonium functional polymer. The anion exchange membrane is composed of three layers of high-porosity polyamide membrane with a covalently attached guanidinium functional polymer. This is followed by a polypropylene nonwoven used as a support layer in the assembled housing capsule.

To assemble the chromatography device, the media components are punched to obtain discs of 1.0625 inches in diameter. The discs are placed in the lower housing 14 inward of the protruding ring 54. The upper housing is positioned on top of the media such that the protruding ring 48 of the upper housing slides between the protruding rings 52 and 54 of the lower housing. This assembly is inverted and placed in a nest or fixturing such that the outer face 68 of the lower housing 14 can come in contact with the ultrasonic horn. To weld the parts, a Branson 20 kHz Ultrasonic welder (Model 2000xdt), a black booster, and a horn with a gain of 2.5× is used. An air pressure of 50 psi, down speed of 50%, amplitude of 80%, weld time of 2 sec, and a trigger force of 50 lbf to start welding were set as fixed parameters. The weld energy was varied from 200-700 Joules to get samples with different media compression levels, with higher energy resulting in a higher compression.

The housing assembly with the chromatography media is placed in a nest directly below the horn such that housing longitudinal axis 26 is aligned to the axis of the ultrasonic horn. When the welding process is initiated, the horn comes down on the lower housing compressing the housing and the media assembly until a force of 50 lbf is reached. At this point, the shear energy directors are under compression. The horn starts to vibrate delivering the set amount of energy to the plastic energy directors and causing localized melting and bonding. After the weld duration, the horn retracts leaving the welded chromatography device in the nest.

To demonstrate the effect of perimeter compression on the performance of chromatography device, samples with different media compression are produced. These samples were tested on an Äkta Pure System (GE Healthcare Life Sciences). Inline, UV-monitoring at 280 nm is used to detect protein breakthrough. The chromatography devices were flushed with a 25 mM TRIS, 50 mM NaCl at pH 8 solution at 1.94 (mL/min)/cm² media for 4.12 mL/cm² media. The flow rate was then slowed to 1.09 (mL/min)/cm² media for 0.36 mL/cm² media and a delta pressure reading is taken. The chromatography devices are then challenged with a ~1 mg/mL BSA solution in the previously mentioned buffer until 10% breakthrough occurs. To establish the termination point of the test, absorbance is measured at 280 nm for the BSA challenge solution and 10% breakthrough value is calculated. The Dynamic Binding Capacity (DBC) at 10% breakthrough for the chromatography device is calculated using Equation 1.

$$DBC_{(mg/cm^2)} = \frac{[\text{Breakthrough volume (mL)} - \text{system holdup volume (mL)}] - [BSA \text{ Concentration (mg/mL)}]}{\text{surface area (cm}^2\text{)}} \quad (1)$$

Hold up volume for this chromatography device was measured to be about 1.1 mL. For all samples, the edge height of the housing Y is measured. The smaller the housing height Y, the larger is the media compression. Table 1 shows the housing height Y, Weld energy and BSA DBC for various samples. The delta pressure for all samples was under 5 psi, consistent with the membrane delta pressure at these flow rates.

TABLE 1

| ID | Height Y (in) | Weld Energy (Joules) | BSA DBC (mg/cm²) |
|---|---|---|---|
| 1 | 0.463 | 500 | 15.9 |
| 2 | 0.462 | 500 | 15.9 |
| 3 | 0.467 | 400 | 16.3 |
| 4 | 0.475 | 400 | 16.9 |
| 5 | 0.454 | 700 | 15.4 |
| 6 | 0.461 | 700 | 15.4 |
| 7 | 0.487 | 200 | 19.1 |
| 8 | 0.484 | 200 | 18.8 |

FIG. 7 shows the BSA DBC as a function of the housing edge height Y. As the housing edge height Y was reduced, the chromatography media had a higher perimeter compression effect that reduced BSA capacity. For this particular chromatography media, the BSA DBC should be 18-20 mg/cm² in order to match the performance of chromatography devices using the same media but with a much larger membrane volume. To match that performance, an ultrasonic weld energy of approximately 200 joules should be used along with the other conditions as described.

What is claimed is:

1. A chromatography device comprising:
an upper housing having an inlet;
a lower housing having an outlet;
the upper and lower housings ultrasonically welded together forming a housing by an interlocking weld extension having a chamfered tip located on either the upper housing or the lower housing and an opposing step located on either the lower housing or the upper housing opposite the interlocking weld extension;
a housing longitudinal axis through the housing;
a compression extension located on either the upper housing or the lower housing positioned closer to the longitudinal axis than the interlocking weld extension and an opposing boss located on either the lower housing or the upper housing opposite the compression extension; and
a media disposed between the compression extension and the boss such that a perimeter of the media is compressed between the compression extension and the boss forming a liquid impermeable seal along the perimeter after the upper housing is ultrasonically welded to the lower housing.

2. The chromatography device of claim 1 wherein the compression extension and the interlocking weld extension are both located on the upper housing and both comprise a protruding ring.

3. The chromatography device of claim 2 wherein the lower housing comprises a third protruding ring and a fourth protruding ring and the interlocking weld extension is located in a valley between the third protruding ring and the fourth protruding ring.

4. The chromatography device of claim 3 wherein the interlocking weld extension has a chamfered tip and a step is located in the valley and the chamfered tip is in contact with the step.

5. The chromatography device of claim 1 wherein the inlet has an inlet longitudinal axis, the inlet longitudinal axis is disposed at an angle $\alpha$ to the housing longitudinal axis; and wherein $\alpha$ is between 10 to 80 degrees.

6. The chromatography device of claim 5 comprising a baffle that redirects a portion of the inlet flow to a direction parallel to the housing longitudinal axis.

7. The chromatography device of claim 5 comprising a vent and the vent has a vent longitudinal axis, the vent longitudinal axis is disposed at an angle $\beta$ to the housing longitudinal axis; and wherein $\beta$ is between 10 to 80 degrees.

8. A chromatography device comprising:
an upper housing having an inlet with an inlet longitudinal axis, a vent with a vent longitudinal axis, and a chamber; the inlet and the vent in fluid communication with the chamber;
a lower housing having an outlet;
a media disposed in the chamber between the inlet and the outlet;
the upper housing and lower housing joined to each other in a fluid tight seal forming a housing with a housing longitudinal axis;
wherein the inlet longitudinal axis is disposed at an angle $\alpha$ to the housing longitudinal axis; the vent longitudinal axis is disposed at an angle $\beta$ to the housing longitudinal axis; and wherein $\alpha$ and $\beta$ are between 10 to 80 degrees; and
wherein a perimeter of the media is located between a compression extension and a boss, and the perimeter is compressed between the compression extension and the boss to prevent bypass of a fluid passing through the device around the perimeter of the media.

9. The chromatography device of claim 8 wherein the media has a membrane volume less than or equal to 3 mL.

10. The chromatography device of claim 8 wherein the compression extension and an interlocking weld extension are both located on the upper housing and both comprise a protruding ring.

11. The chromatography device of claim 10 wherein the lower housing comprises a third protruding ring and a fourth protruding ring and the interlocking weld extension is located in a valley between the third protruding ring and the fourth protruding ring.

12. The chromatography device of claim 8 comprising a baffle that redirects a portion of the inlet flow to a direction parallel to the housing longitudinal axis.

* * * * *